Patented May 29, 1945

2,377,148

UNITED STATES PATENT OFFICE 2,377,148

NEUTRAL ORGANIC ESTERS OF SULPHUROUS ACID AS PEST-CONTROL AGENTS

Ingenuin Hechenbleikner, Stamford, Conn., assignor to American Cyanamid Company, New York, N. Y., a corporation of Maine No Drawing. Application February 12, 1941,
Serial No. 378,572

2 Claims. (Cl. 167—22)

The present invention relates to pest-control compositions and is concerned more particularly with a class of compounds of exceptional activity for the control of insects and allied pests.

The invention is based upon the discovery that certain neutral organic esters of sulphurous acid possess powerful insecticidal activity against insects which are particularly difficult to exterminate, for example, the citrus red spider, *Tetranychus citri*, and the bean aphid, *Aphis rumicis*, and that such activity is obtained without any substantial harmful or deleterious action on the vegetation infested with the insect.

The compounds contemplated for use as insecticides in this invention may be represented by the general formula:

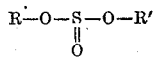

in which R and R' represent substituted and unsubstituted alkyl, aryl and aralkyl radicals and in which when R and R' are unsubstituted, their total carbon atoms is not less than 12. They include, for example, 2,2'-dichlorodiethyl sulphite, 2,2'-dicyanodiethyl sulphite, 2,2'-dithiomethyldiethyl sulphite, 2,2'-dicarboxyethyldiethyl sulphite, 3,3'-dinitrodipropyl sulphite, di-2-ethylhexyl sulphite, di-n-octyl sulphite, dilauryl sulphite, didodecyl sulphite, ditetradecyl sulphite, dioctadecyl sulphite, diphenyl sulphite, di-p-chlorophenyl sulphite, di-o-cresyl sulphite, di-1-naphthyl sulphite, dibenzyl sulphite, di-o-bromobenzyl sulphite, di-1-naphthylmethyl sulphite, ethyl-o-cresyl sulphite, hexylbenzyl sulphite, phenylbenzyl sulphite, ditetrahydrofurfuryl sulphite, di-o-cyclohexylphenyl sulphite, etc.

The following examples illustrate in detail a general method of preparing the above insecticidal compounds. Materials employed are in parts by weight.

Example 1

A mixture consisting of 50 parts of 2-ethylhexyl alcohol, 30 parts of pyridine and 75 parts of ether was placed in a vessel fitted with a stirrer and reflux condenser. 15 parts of thionyl chloride were gradually added to the agitated mixture at such a rate that the ether refluxed slowly. A colorless precipitate of pyridine hydrochloride separated. After all the thionyl chloride had been added, the mixture was stirred for 15 minutes and then quickly filtered. The ether solution was washed with a small amount of water, dried over sodium sulphate and distilled at reduced pressure. 50 parts of di-2-ethylhexyl sulphite were obtained, boiling at 116° C. at 1 mm.

Example 2

45 parts of 2,2'-dichlorodiethyl sulphite, a colorless, odorless liquid, distilling at 80° C. at 1 mm., were obtained according to the procedure of Example 2, employing 40 parts of ethylene chlorohydrin, 30 parts of thionyl chloride, 41 parts of pyridine, and 110 parts of ether.

Example 3

Using the procedure of Example 1 and employing 37 parts of lauryl alcohol, 12 parts of thionyl chloride, 16 parts of pyridine and 75 parts of ether, 45 parts of dilauryl sulphite, a pale yellow oil boiling at about 190° C. at a pressure of 1 mm., were obtained.

Example 4

A quantitative yield of di-o-cyclohexylphenyl sulphite, a light colored, pleasant-smelling oil, was obtained by following the procedure of Example 2 and employing 17.6 parts of o-cyclohexylphenol, 6 parts of thionyl chloride, 75 parts of ether, and 7.9 parts of pyridine.

Other members of the series may be produced in a similar manner.

Spray solutions were prepared by dissolving the insecticidal compounds in a solvent medium consisting of 65% acetone and 35% water. Table I shows the kills obtained under comparable conditions for the various dilutions when the sprays were used against the citrus red spider, *Tetranychus citri*, and the bean aphid, *Aphis rumicis*.

Table I

| Insect | Compound | Dilution | Per cent kill |
|---|---|---|---|
| Red spider | Di-2-ethylhexyl sulphite | 1-1,000 | 100 |
| Do | do | 1-2,000 | 99.6 |
| Do | do | 1-4,000 | 85.3 |
| Do | 2,2'-dichlorodiethyl sulphite | 1-500 | 73.6 |
| Do | 2,2'-dicyanodiethyl sulphite | 1-500 | 84.8 |
| Do | Dilauryl sulphite | [1]1-1,000 | 100 |
| Do | do | 1-2,000 | 100 |
| Do | do | 1-5,000 | 96.4 |
| Do | do | 1-10,000 | 92 |
| Do | Di-o-cyclohexylphenyl sulphite | 1-500 | 100 |
| Do | do | 1-1,000 | 98.4 |
| Do | Didodecyl sulphite | 1-2,000 | 100 |
| Do | Ditetradecyl sulphite | 1-500 | 98.8 |
| Do | do | 1-1,000 | 94 |
| Aphid | Di-2-ethylhexyl sulphite | 1-500 | 98.7 |
| Do | do | 1-1,000 | 64.7 |
| Do | 2,2'-dichlorodiethyl sulphite | 1-500 | 99 |
| Do | do | 1-1,000 | 79.6 |
| Do | Dilauryl sulphite | 1-500 | 90.2 |
| Do | Didodecyl sulphite | 1-500 | 96.5 |
| Do | Ditetradecyl sulphite | 1-500 | 96.9 |

[1] A 100% kill of the red spider eggs is obtained in conjunction with the 100% kill of the active forms.

These new insecticides are particularly effective for controlling soft bodied insects, such as aphids, thrips, etc. They are also highly efficacious against such plant pests and microorganisms as fungi, molds, mildews, rusts, smuts, etc., with the result that they may be employed for purposes of preserving, disinfecting and the like.

Among the outstanding characteristics of these insecticidal compounds are their high toxicity in low concentrations and their innocuousness to plant life.

It has been found that the neutral organic esters of other inorganic acids when employed as contact insecticides are considerably less effective than the products of this invention. Thus, for example, n-amyl borate at a dilution of 1-400 (solvent medium consisting of 65% acetone and 35% water) gave only an 8% control on citrus red spiders, and diethyl sulphate at a dilution of 1-500 gave only a 9% control on bean aphids and no kill of the citrus red spiders.

These new insecticides may be applied in any of the conventional manners, for example, the compounds may be incorporated in liquids for spraying purposes, or they may be effectively used in dusts with such inert solid diluents as walnut shell, wood flour, talc and the like.

While the invention has been described with particular reference to specific embodiments, it is to be understood that it is not to be limited thereto but is to be construed broadly and restricted solely by the scope of the appended claims.

I claim:

1. A pest-control composition containing a toxic amount of dilauryl sulphite and a carrier therefor.

2. A method of killing insects which includes the step of exposing them to a toxic amount of dilauryl sulphite.

INGENUIN HECHENBLEIKNER.